US010465558B2

(12) United States Patent
Shapiro et al.

(10) Patent No.: US 10,465,558 B2
(45) Date of Patent: Nov. 5, 2019

(54) MULTI-PIECE SHROUD HANGER ASSEMBLY

(71) Applicant: General Electric Company, Schenectady, NY (US)

(72) Inventors: Jason David Shapiro, Lynn, MA (US); Michael John Franks, Cincinnati, OH (US); David Scott Stapleton, Boston, MA (US)

(73) Assignee: General Electric Company, Schenectady, NY (US)

( * ) Notice: Subject to any disclaimer, the term of this patent is extended or adjusted under 35 U.S.C. 154(b) by 347 days.

(21) Appl. No.: 15/318,121

(22) PCT Filed: Apr. 28, 2015

(86) PCT No.: PCT/US2015/028050
§ 371 (c)(1),
(2) Date: Dec. 12, 2016

(87) PCT Pub. No.: WO2015/191174
PCT Pub. Date: Dec. 17, 2015

(65) Prior Publication Data
US 2017/0114670 A1 Apr. 27, 2017

Related U.S. Application Data

(60) Provisional application No. 62/011,244, filed on Jun. 12, 2014.

(51) Int. Cl.
*F01D 25/24* (2006.01)
*F01D 11/08* (2006.01)

(52) U.S. Cl.
CPC ............ *F01D 25/246* (2013.01); *F01D 11/08* (2013.01); *F01D 25/24* (2013.01);
(Continued)

(58) Field of Classification Search
CPC ........ F01D 25/246; F01D 25/28; F01D 11/08; F01D 9/04; F05D 2240/11; F05D 2300/6033; F05D 2260/38
See application file for complete search history.

(56) References Cited

U.S. PATENT DOCUMENTS 3,583,824 A 6/1971 Smuland et al.
3,778,185 A 12/1973 Plowman et al.
(Continued)

FOREIGN PATENT DOCUMENTS

CA 2520792 A1 3/2006
CN 1219215 A 6/1999
(Continued)

OTHER PUBLICATIONS

PCT Search Report and Written Opinion issued in connection with related PCT Application No. PCT/US2014/035089 dated Jul. 1, 2014.
(Continued)

*Primary Examiner* — Justin D Seabe
*Assistant Examiner* — Topaz L. Elliott
(74) *Attorney, Agent, or Firm* — Dority & Manning, P.A.

(57) ABSTRACT

A shroud hanger assembly or shroud assembly is provided for components which may be formed of materials having differing coefficient thermal expansion. The assembly includes a multi-piece hanger including a shroud positioned in a cavity between a first hanger portion and a second hanger portion. A shroud may be formed of a low coefficient of thermal expansion material which may have a differing coefficient thermal expansion than the material defining the shroud hanger. The shroud is deflected by an axial force acting between the hanger and the shroud which also forms
(Continued)

a seal. The seal compensates for differing rates of thermal growth between the shroud and the hanger throughout the engine operating envelope.

16 Claims, 9 Drawing Sheets

(52) U.S. Cl.
CPC ...... *F05D 2230/60* (2013.01); *F05D 2240/11* (2013.01); *F05D 2260/20* (2013.01); *F05D 2260/38* (2013.01); *F05D 2300/6033* (2013.01); *Y02T 50/672* (2013.01)

(56) References Cited

U.S. PATENT DOCUMENTS

| | | | |
|---|---|---|---|
| 4,087,199 A * | 5/1978 | Hemsworth | F01D 11/08 415/173.3 |
| 4,460,311 A | 7/1984 | Trappmann et al. | |
| 4,596,116 A | 6/1986 | Mandet et al. | |
| 4,759,687 A * | 7/1988 | Miraucourt | F01D 11/08 415/127 |
| 4,863,345 A | 9/1989 | Thompson et al. | |
| 5,048,288 A | 9/1991 | Bessette et al. | |
| 5,074,748 A | 12/1991 | Hagle | |
| 5,080,557 A | 1/1992 | Berger | |
| 5,092,735 A * | 3/1992 | Katy | F01D 11/08 415/115 |
| 5,127,793 A | 7/1992 | Walker et al. | |
| 5,137,421 A | 8/1992 | Hayton | |
| 5,154,577 A | 10/1992 | Kellock et al. | |
| 5,169,287 A | 12/1992 | Proctor et al. | |
| 5,188,507 A | 2/1993 | Sweeney | |
| 5,197,853 A | 3/1993 | Creevy et al. | |
| 5,249,877 A * | 10/1993 | Corsmeier | F01D 25/246 403/24 |
| 5,423,659 A | 6/1995 | Thompson | |
| 5,593,277 A | 1/1997 | Proctor et al. | |
| 5,655,876 A | 8/1997 | Rock et al. | |
| 5,738,490 A | 4/1998 | Pizzi | |
| 5,780,146 A | 7/1998 | Mason et al. | |
| 5,964,575 A | 10/1999 | Marey | |
| 6,113,349 A | 9/2000 | Bagepalli et al. | |
| 6,164,656 A | 12/2000 | Frost | |
| 6,290,459 B1 | 9/2001 | Correia | |
| 6,315,519 B1 | 11/2001 | Bagepalli et al. | |
| 6,340,285 B1 | 1/2002 | Gonyou et al. | |
| 6,402,466 B1 | 6/2002 | Burdgick et al. | |
| 6,412,149 B1 | 7/2002 | Overberg | |
| 6,503,051 B2 | 1/2003 | Predmore | |
| 6,503,574 B1 | 1/2003 | Skelly et al. | |
| 6,699,011 B2 | 3/2004 | Cot et al. | |
| 6,702,550 B2 | 3/2004 | Darkins, Jr. et al. | |
| 6,733,233 B2 | 5/2004 | Jasklowski et al. | |
| 6,733,235 B2 | 5/2004 | Alford et al. | |
| 6,758,653 B2 | 7/2004 | Morrison | |
| 6,808,363 B2 | 10/2004 | Darkins, Jr. et al. | |
| 6,821,085 B2 | 11/2004 | Darkins, Jr. et al. | |
| 6,884,026 B2 | 4/2005 | Glynn et al. | |
| 6,887,528 B2 | 5/2005 | Lau et al. | |
| 6,893,214 B2 | 5/2005 | Alford et al. | |
| 6,942,203 B2 | 9/2005 | Schroder et al. | |
| 7,011,493 B2 | 3/2006 | Marchi et al. | |
| 7,052,235 B2 | 5/2006 | Alford et al. | |
| 7,217,089 B2 | 5/2007 | Durocher et al. | |
| 7,238,002 B2 | 7/2007 | Cairo et al. | |
| 7,270,518 B2 | 9/2007 | Barb et al. | |
| 7,278,820 B2 | 10/2007 | Keller | |
| 7,556,475 B2 | 7/2009 | Roberts, III et al. | |
| 7,563,071 B2 | 7/2009 | Campbell et al. | |
| 7,595,114 B2 | 9/2009 | Meschter et al. | |
| 7,686,577 B2 | 3/2010 | Morrison et al. | |
| 7,726,936 B2 | 6/2010 | Keller et al. | |
| 7,749,565 B2 | 7/2010 | Johnson et al. | |
| 7,753,643 B2 | 7/2010 | Gonzalez et al. | |
| 7,819,625 B2 | 10/2010 | Merrill et al. | |
| 7,871,244 B2 | 1/2011 | Marini et al. | |
| 7,908,867 B2 | 3/2011 | Keller et al. | |
| 7,950,234 B2 | 5/2011 | Radonovich et al. | |
| 7,968,217 B2 | 6/2011 | Sarrafi-Nour et al. | |
| 8,047,773 B2 | 11/2011 | Bruce et al. | |
| 8,079,807 B2 | 12/2011 | Shapiro et al. | |
| 8,118,546 B2 | 2/2012 | Morrison | |
| 8,128,350 B2 | 3/2012 | Schiavo et al. | |
| 8,167,546 B2 | 5/2012 | Shi et al. | |
| 8,246,299 B2 | 8/2012 | Razzell et al. | |
| 8,303,245 B2 | 11/2012 | Foster et al. | |
| 8,303,247 B2 | 11/2012 | Schlichting et al. | |
| 8,328,505 B2 | 12/2012 | Shi et al. | |
| 8,511,975 B2 | 8/2013 | Shi et al. | |
| 8,834,106 B2 | 9/2014 | Luczak | |
| 9,175,579 B2 * | 11/2015 | Franks | F01D 25/246 |
| 9,726,043 B2 * | 8/2017 | Franks | F01D 11/08 |
| 9,874,104 B2 * | 1/2018 | Shapiro | F01D 25/246 |
| 2002/0127108 A1 | 9/2002 | Crall et al. | |
| 2003/0031557 A1 | 2/2003 | Arilla et al. | |
| 2003/0215328 A1 | 11/2003 | McGrath et al. | |
| 2004/0005216 A1 | 1/2004 | Suzumura et al. | |
| 2004/0005452 A1 | 1/2004 | Dorfman et al. | |
| 2004/0219011 A1 | 11/2004 | Albers et al. | |
| 2005/0003172 A1 | 1/2005 | Wheeler et al. | |
| 2005/0111965 A1 | 5/2005 | Lowe et al. | |
| 2005/0129499 A1 | 6/2005 | Morris et al. | |
| 2005/0141989 A1 | 6/2005 | Sayegh et al. | |
| 2006/0078429 A1 | 4/2006 | Darkins, Jr. et al. | |
| 2006/0083607 A1 | 4/2006 | Synnott et al. | |
| 2006/0110247 A1 | 5/2006 | Nelson et al. | |
| 2006/0110248 A1 | 5/2006 | Nelson et al. | |
| 2006/0292001 A1 | 12/2006 | Keller et al. | |
| 2007/0031245 A1 | 2/2007 | Ruthemeyer et al. | |
| 2007/0154307 A1 | 7/2007 | Cairo | |
| 2008/0025838 A1 | 1/2008 | Marini et al. | |
| 2008/0206542 A1 | 8/2008 | Vance et al. | |
| 2009/0010755 A1 | 1/2009 | Keller et al. | |
| 2009/0053045 A1 | 2/2009 | Nowak et al. | |
| 2009/0208322 A1 | 8/2009 | McCaffrey | |
| 2009/0324393 A1 | 12/2009 | Gonzalez et al. | |
| 2011/0182720 A1 | 7/2011 | Kojima et al. | |
| 2011/0274538 A1 | 11/2011 | Shi et al. | |
| 2011/0293410 A1 | 12/2011 | Marusko et al. | |
| 2011/0299976 A1 | 12/2011 | Uskert | |
| 2011/0318171 A1 | 12/2011 | Albers et al. | |
| 2012/0082540 A1 | 4/2012 | Dziech et al. | |
| 2012/0107122 A1 | 5/2012 | Albers et al. | |
| 2012/0156029 A1 | 6/2012 | Karafillis et al. | |
| 2012/0171023 A1 | 7/2012 | Albers et al. | |
| 2012/0171027 A1 | 7/2012 | Albers et al. | |
| 2012/0247124 A1 * | 10/2012 | Shapiro | F01D 9/04 60/805 |
| 2012/0260670 A1 | 10/2012 | Foster et al. | |
| 2012/0263582 A1 | 10/2012 | Foster et al. | |
| 2012/0275898 A1 | 11/2012 | McCaffrey et al. | |
| 2012/0319362 A1 | 12/2012 | Tholen et al. | |
| 2013/0000324 A1 | 1/2013 | Alvanos et al. | |
| 2013/0004306 A1 | 1/2013 | Albers et al. | |
| 2013/0011248 A1 | 1/2013 | Croteau et al. | |
| 2013/0017057 A1 | 1/2013 | Lagueux | |
| 2013/0156550 A1 * | 6/2013 | Franks | F01D 11/08 415/126 |
| 2013/0156556 A1 * | 6/2013 | Franks | F01D 25/246 415/182.1 |
| 2013/0266435 A1 | 10/2013 | Foster et al. | |
| 2014/0255170 A1 | 9/2014 | Hillier | |
| 2014/0271144 A1 | 9/2014 | Landwehr et al. | |
| 2014/0271145 A1 | 9/2014 | Thomas et al. | |
| 2014/0294571 A1 | 10/2014 | Hillier | |
| 2014/0294572 A1 | 10/2014 | Hillier et al. | |
| 2014/0308113 A1 | 10/2014 | Westphal et al. | |
| 2015/0016970 A1 | 1/2015 | Smith et al. | |
| 2015/0377035 A1 | 12/2015 | Freeman et al. | |
| 2016/0097303 A1 * | 4/2016 | Baldiga | F01D 11/08 416/182 |

(56) References Cited

U.S. PATENT DOCUMENTS

| | | | |
|---|---|---|---|
| 2016/0251982 A1* | 9/2016 | Shapiro | F01D 11/08 |
| | | | 415/134 |
| 2016/0312639 A1* | 10/2016 | Shapiro | F01D 9/04 |
| 2017/0130600 A1* | 5/2017 | Shapiro | F01D 11/08 |
| 2017/0198607 A1* | 7/2017 | Shapiro | F01D 25/246 |
| 2017/0268366 A1* | 9/2017 | McCaffrey | F01D 11/08 |

FOREIGN PATENT DOCUMENTS

| | | |
|---|---|---|
| CN | 1542259 A | 11/2004 |
| CN | 102135020 A | 7/2011 |
| EP | 0770761 A1 | 5/1997 |
| EP | 1225309 A1 | 7/2002 |
| EP | 1548144 A1 | 6/2005 |
| EP | 1801361 A1 | 6/2007 |
| EP | 2631434 A2 | 8/2013 |
| EP | 2774905 A1 | 9/2014 |
| FR | 2540938 A1 | 8/1984 |
| FR | 2580033 A1 | 10/1986 |
| FR | 2942844 A1 | 9/2010 |
| GB | 2397102 A | 7/2004 |
| JP | 5710710 A | 1/1982 |
| JP | 63239301 A | 10/1988 |
| JP | 05141270 A | 6/1993 |
| JP | 0913904 A | 1/1997 |
| JP | 10103014 A | 4/1998 |
| JP | 2002276301 A | 9/2002 |
| JP | 2004036443 A | 2/2004 |
| JP | 2005155626 A | 6/2005 |
| JP | 2006105393 A | 4/2006 |
| JP | 2007046603 A | 2/2007 |
| JP | 2007182881 A | 7/2007 |
| JP | 2013170578 A | 9/2013 |
| WO | 02099254 A1 | 12/2002 |
| WO | 03026886 A2 | 4/2003 |
| WO | 2013163505 A1 | 10/2013 |
| WO | 2014130762 A1 | 8/2014 |
| WO | 2014186099 A1 | 11/2014 |

OTHER PUBLICATIONS

U.S. Non-Final Office Action issued in connection with related U.S. Appl. No. 13/327,349 dated Jul. 22, 2014.

U.S. Non-Final Office Action issued in connection with related U.S. Appl. No. 13/402,616 dated Jul. 24, 2014.

U.S. Non-Final Office Action issued in connection with related U.S. Appl. No. 13/327,349 dated Jan. 27, 2015.

PCT Search Report and Written Opinion issued in connection with related PCT Application No. PCT/US2014/068490 dated Mar. 5, 2015.

Chinese office action issued in connection with related CN Application No. 201210541477.1 dated May 12, 2015.

Chinese office action issued in connection with related CN Application No. 201310056712.0 dated Jun. 19, 2015.

European Search Report and opinion issued in connection with related EP Application No. 12195953.0 dated Jul. 22, 2015.

Chinese Office Action issued in connection with related CN Application No. 201480028735.3 dated Sep. 5, 2016.

Japanese Office Action issued in connection with related JP Application No. 2012269895 dated Oct. 4, 2016.

Japanese Office Action issued in connection with related JP Application No. 2013027200 dated Oct. 18, 2016.

Chinese office action issued in connection with related CN Application No. 201480067368.8 dated Nov. 2, 2016.

Japanese Office Action issued in connection with related JP Application No. 2016513961 dated Nov. 8, 2016.

Japanese Notice of Allowance issued in connection with related JP Application No. 2013027200 dated Nov. 29, 2016.

Japanese Search Report issued in connection with related JP Application No. 2016029448 dated Jan. 25, 2017.

Japanese Notice of Allowance issued in connection with related JP Application No. 2016513961 dated Feb. 21, 2017.

Japanese Search Report issued in connection with related JP Application No. 2012269895 dated Mar. 21, 2017.

Jason David Shapiro, Feb. 27, 2015, U.S. Appl. No. 14/634,060.

Michael John Franks et al., Dec. 15, 2011, U.S. Appl. No. 13/327,349.

Michael John Franks et al., Feb. 22, 2012, U.S. Appl. No. 13/402,616.

Jonathan David Baldiga et al., Nov. 17, 2015, U.S. Appl. No. 14/891,806.

Jason David Shapiro et al., Jun. 7, 2016, U.S. Appl. No. 15/102,370.

PCT Search Report and Written Opinion issued in connection with related PCT Application No. PCT/US2015/027247 dated Jul. 10, 2015.

PCT Search Report and Written Opinion issued in connection with related PCT Application No. PCT/US2015/029236 dated Jul. 20, 2015.

PCT Search Report and Written Opinion issued in connection with related PCT Application No. PCT/US2015/029342 dated Jul. 22, 2015.

PCT Search Report and Written Opinion issued in connection with corresponding PCT Application No. PCT/US2015/028050 dated Aug. 11, 2015.

European Search Report and Opinion issued in connection with related EP Application No. 16155655.0 dated Aug. 1, 2016.

First Office Action and Search issued in connection with corresponding CN Application No. 201580031472.6 dated Jul. 20, 2017.

Baldiga, J.D., et al., Cmc shroud support system, GE co-pending U.S. Appl. No. 61/824,491, filed May 17, 2013.

Schilling, J.C., et al., Shroud hanger assembly, GE co-pending U.S. Appl. No. 62/011,237, filed Jun. 12, 2014.

Shapiro, J.D., et al., Cmc shroud support system, GE co-pending U.S. Appl. No. 61/915,114, filed Dec. 12, 2013.

Shapiro, J.D., et al., Shroud hanger assembly, GE co-pending U.S. Appl. No. 62/011,231, filed Jun. 12, 2014.

Shapiro, J.D., et al., Shroud hanger assembly, GE co-pending U.S. Appl. No. 62/011,241, filed Jun. 12, 2014.

U.S. Non-Final Office Action issued in connection with Related U.S. Appl. No. 14/634,060 dated May 17, 2017.

* cited by examiner

MULTI-PIECE SHROUD HANGER ASSEMBLY

CROSS-REFERENCE TO RELATED APPLICATIONS

This application is a national stage application under 35 U.S.C. § 371(c) of prior filed, co-pending PCT application Ser. No. PCT/US2015/028050, entitled "MULTI-PIECE SHROUD HANGER ASSEMBLY", filed 28 Apr. 2015, which claims priority to U.S. Provisional Patent Application Ser. No. 62/011,244 titled "Shroud Hanger Assembly", filed on 12 Jun. 2014, the disclosures of which are incorporated by reference herein.

TECHNICAL FIELD

The present embodiments relate to a shroud hanger assembly for use in a gas turbine engine. More specifically, present embodiments relate to, without limitation, a shroud hanger assembly having a shroud which is biased at an aft end thereof.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

Due to operating temperatures within the primary flowpath of the gas turbine engine, it may be beneficial to utilize materials that are high temperature capable. For example, to operate effectively in such strenuous temperature and pressure conditions, composite materials have been suggested and, in particular for example, ceramic matrix composite (CMC) materials. These materials have higher temperature capability than metallic parts. The higher operating temperatures within the engine result in higher engine efficiency if cooling air for parts can be reduced, and these materials may be lighter weight than traditionally used metals. CMC, for example, may require less cooling air. However, such CMC and other materials have mechanical properties that must be considered during the design and application of the CMC. CMC materials have relatively low tensile ductility or low strain to failure when compared to metallic materials. Also, CMC materials have a coefficient of thermal expansion which differs significantly from metal alloys used as restraining supports or hangers for CMC type materials.

One use for such materials is in a turbine shroud. However, various problems are known to exist with shroud hanger assemblies. For example, some assemblies utilize a one-piece hanger construction that is deflected apart during the insertion of the shroud into a cavity of the shroud hanger. This interference at assembly is required because of the difference in coefficient of expansion of the hanger and shroud. However, this mechanical deflection may cause bending or even yielding of the hanger arms during positioning of the shroud which is undesirable and may cause premature deformation and leakage at high temperature. Therefore, it may be beneficial to have an assembly which is more easily assembled and will not cause yielding of the hanger.

As stated, the shroud hanger assembly must be properly sealed. Such sealing issues develop due to thermal growth of parts of differing materials. Such growth may result in gaps between sealing surfaces and may be undesirable.

It may be beneficial to overcome these and other deficiencies to provide a shroud hanger assembly which provides for sealing of the interfaces between parts of differing material and minimizes the required deflection at assembly required to compensate for differential thermal growth therebetween.

The information included in this Background section of the specification, including any references cited herein and any description or discussion thereof, is included for technical reference purposes only and is not to be regarded subject matter by which the scope of the invention is to be bound.

SUMMARY

A shroud hanger assembly or shroud assembly is provided for components which may be formed of materials having differing coefficient thermal expansion. The assembly includes a multi-piece hanger including a shroud positioned in a cavity between a first hanger portion and a second hanger portion. A shroud may be formed of a high coefficient of thermal expansion material which may have a differing coefficient thermal expansion than the material defining the shroud hanger. The shroud is deflected by a force acting between the hanger and the shroud which also forms a seal. The seal compensates for differing rates of thermal growth between the shroud and the hanger throughout the engine operating envelope.

According to some embodiments, a shroud assembly for dimensionally incompatible components comprises an engine casing, a multi-piece shroud hanger assembly formed of a first material, the shroud hanger having a forward hanger portion and a rearward hanger portion, the shroud hanger connected to the engine casing, a shroud formed of a low coefficient of thermal expansion second material different from the first material, the shroud disposed between the forward hanger portion and the rearward hanger portion, at least one cooling channel extending into the forward hanger portion of said shroud hanger assembly for impingement cooling of the shroud, wherein at least one of the forward hanger portion and the rearward hanger portion apply an axial interference force on the shroud, a biasing force acting against one of an aft end and a forward end of said shroud.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the present invention is provided in the following written description of various embodiments of the invention, illustrated in the accompanying drawings, and defined in the appended claims. Therefore, no limiting interpretation of the summary is to be understood without further reading of the entire specification, claims and drawings included herewith.

BRIEF DESCRIPTION OF THE DRAWINGS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
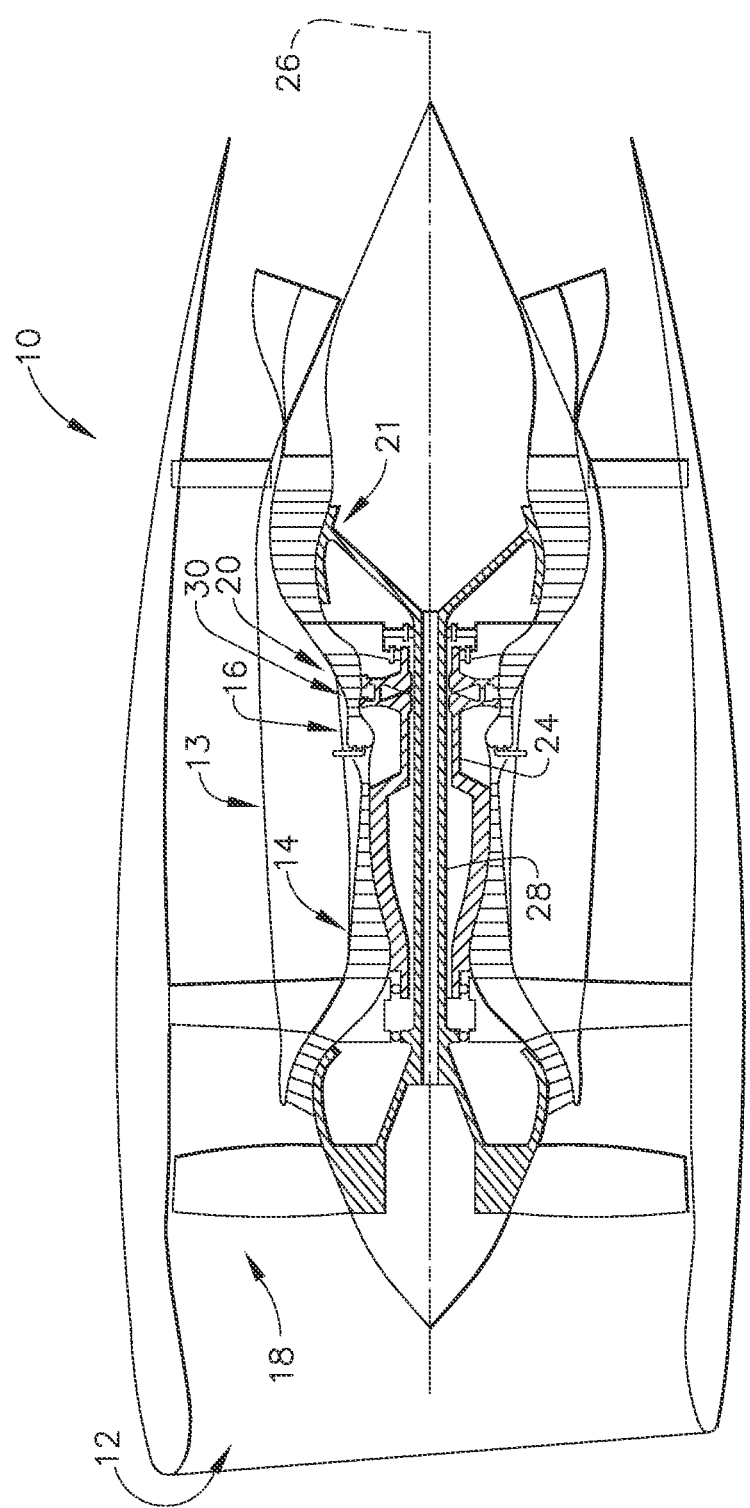
FIG. 1 is a side section view of an exemplary gas turbine engine.

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of a shroud hanger assembly are depicted in FIGS. 1-9. The shroud hanger assembly includes a multi-piece hanger assembly which at least partially surrounds a shroud and retains the shroud in a desired position. An axial force is applied to the shroud and compensates for thermal growth differences between components at least in an axial direction. The biasing force may be provided by one or more springs. Additionally, the one or more springs may function to seal air leakage from the assembly due to such thermal growth.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring now to FIG. 1, a schematic side section view of a gas turbine engine 10 is shown. The function of the turbine is to extract energy from high pressure and temperature combustion gases and convert the energy into mechanical energy for work. The turbine 10 has an engine inlet end 12 wherein air enters the core or propulsor 13 which is defined generally by a compressor 14, a combustor 16 and a multi-stage high pressure turbine 20 all located along an engine axis 26. Collectively, the propulsor 13 provides power during operation. The gas turbine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages.

Present embodiments are at least directed to a shroud hanger assembly 30 which is shown generically. The shroud hanger assembly 30 may be utilized to define a flow path adjacent to rotating parts such as turbine blades 20, 21 or blades within a compressor 14. The shroud hanger assembly 30 is shown schematically in the schematic FIG. 1 view. The assembly 30 may be disposed at a radially outward end of the turbine 20, 21 blades or the compressor 14 blades. As the blades of the turbine or compressor rotate, a shroud 50 (FIG. 2) in the assembly provides a flowpath boundary.

Figure 2:
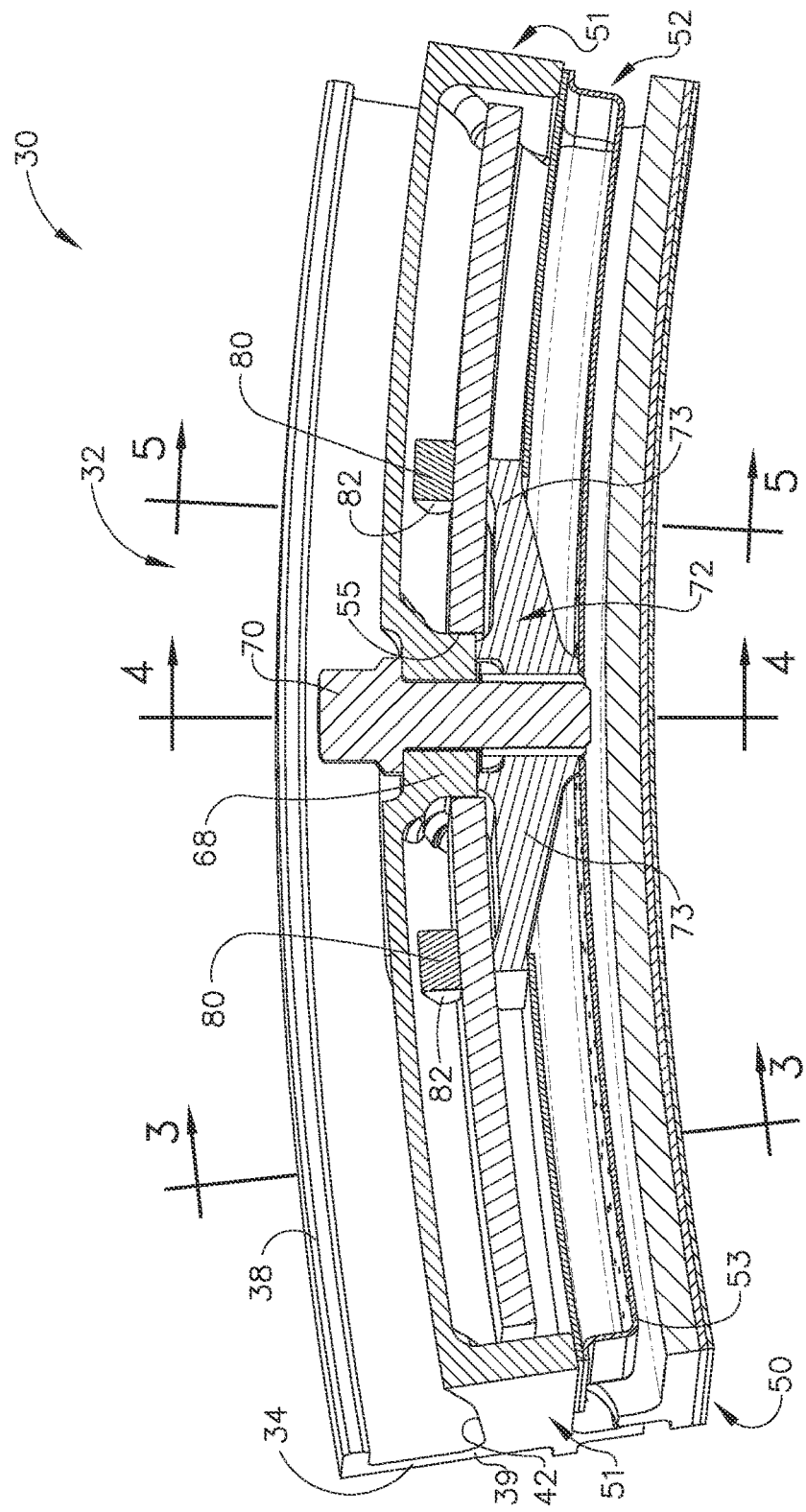
FIG. 2 is a circumferential section view of an exemplary shroud hanger assembly.
Figure 3:
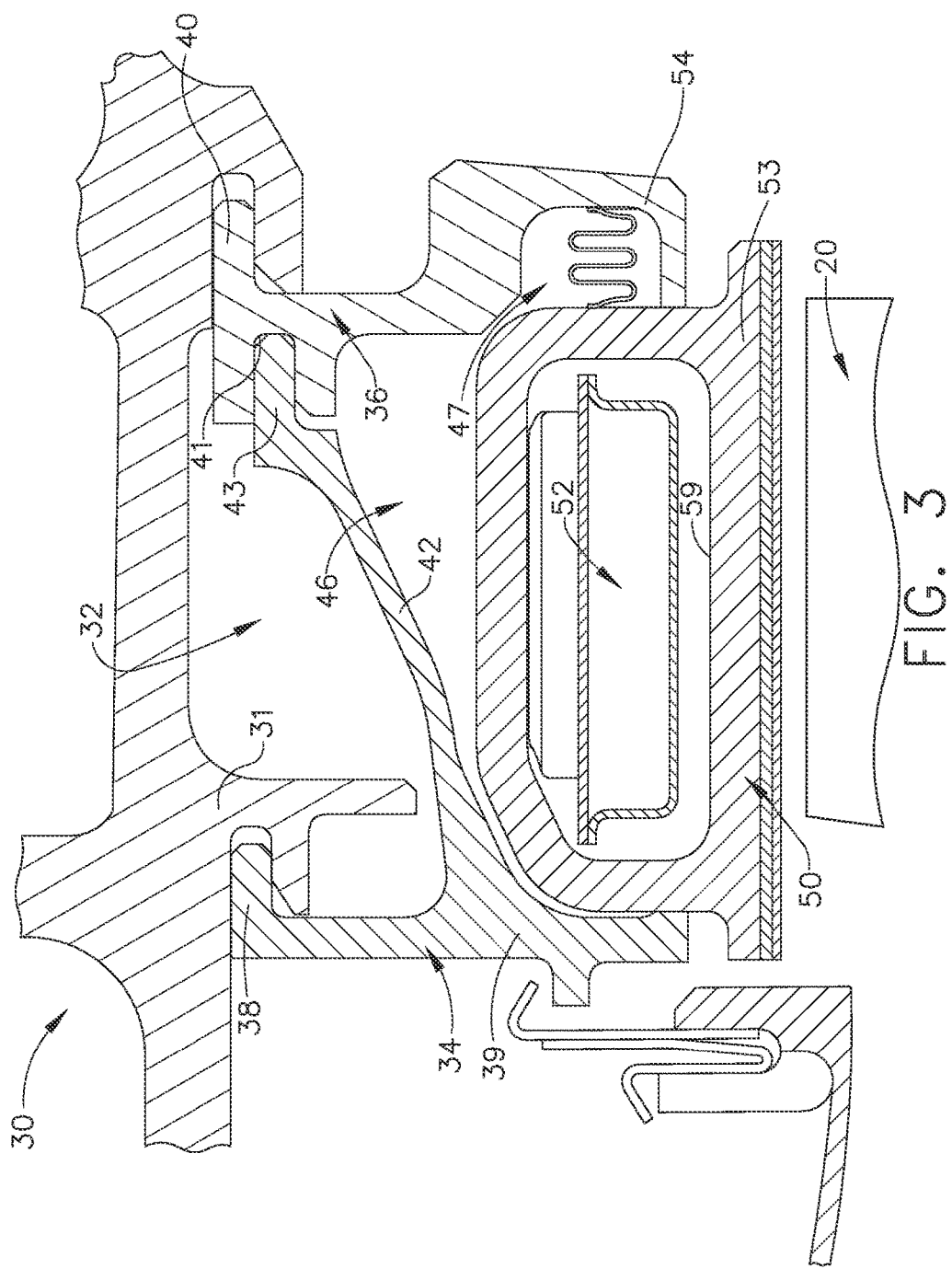
FIG. 3 is a side section view of an embodiment of a shroud hanger assembly.

Referring now to FIG. 2, circumferential cross-section of an exemplary hanger assembly 30 is depicted. In the depicted view, the section is taken in the circumferential direction through the middle of the hanger 32. The hanger 32 may be formed of two or more portions. The hanger 32 includes a first hanger portion 34 and a second hanger portion 36 (FIG. 3). The hanger 32 may be split in a circumferential direction, be split in an axial direction, or some combination thereof. According to some embodiments, a bolt 70 is utilized to retain a shroud 50, baffle 52 as well as the retainer 72. The bolt 70 may be formed of a Waspaloy metallic material, for example. However, this is a non-limiting embodiment and merely one exemplary type of bolt material which may be utilized. The first hanger portion 34 of the hanger assembly 32 includes a tab 38. The tab 38 is used to engage the engine casing 31 (FIG. 3) so that the assembly is retained in a fixed position. Depending from the tab 38 is a leg 39 further defining hanger portion 34. A web 42 is shown extending from the leg 39 of the first hanger portion 34 in an aft direction. The web 42 may extend in an axial direction or at an angle to the axial direction. Further, the web 42 extends circumferentially through the segment. The web 42 may also extend linearly, curvilinearly or combinations thereof. The web 42 defines a ceiling for a cavity 46 (FIG. 3) formed within the hanger 32 wherein the shroud 50 is disposed.

At circumferential ends of the hanger 32 are end walls 51. The web 42 extends circumferentially between the end walls or slash faces 51 of the hanger first portion 34.

The slash face walls 51 may further include slots for spline seals extending from the first hanger portion 34 to the second hanger portion 36 and may extend about the geometry of the structure so as to substantially seal between the adjacent slash faces of adjacent hanger assembly 30.

Beneath the web 42, the shroud 50 is shown. The shroud 50 is a generally closed top shroud with a central aperture 55 through which retaining structure or assemblies may pass. The bolt 70 extends through the web 42 and a projection 68 extending partially into the aperture 55 so as to locate the shroud 50 in a circumferential direction relative to the hanger 32. A retainer 72 is positioned beneath the upper surface of the shroud 50 and captures the shroud in a radial direction from moving downwardly. While a closed top shroud may be utilized as depicted, this is not limiting and other embodiments are within the scope of the instant disclosure as shown further herein.

The second hanger portion 36 (FIG. 3) comprises a hanger arm 80 and a projection 82 which engage the shroud 50 so that the shroud 50 is captured radially between the arm 80 and the retainer 72. Alternatively, however, the arms 80 and projections 82 may extend from the forward hanger portion 34 in other embodiments.

The retainer 72 may have legs 73 extending circumferentially beneath shroud 50. The retainer 72 and arms 80 may be aligned in the radial direction as shown or may be offset from one another. The retainer 72 is fastened in the assembly 30 with bolt 70.

Figure 4:
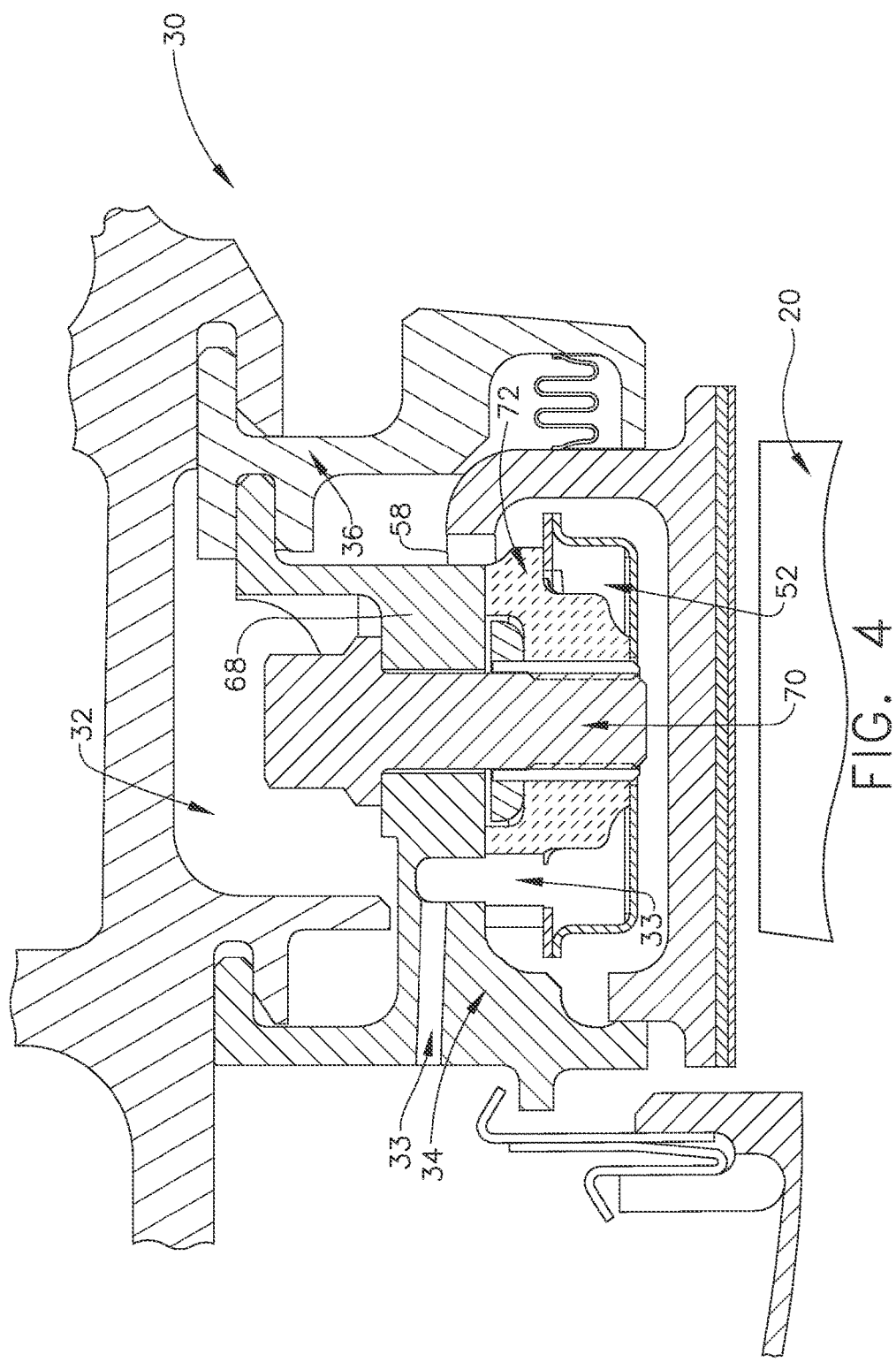
FIG. 4 is an alternate side section view of an embodiment of the shroud hanger assembly.

Positioned within the shroud 50 is a baffle 52. The baffle 52 receives cooling air from the first hanger portion 34 by way of one or more cooling apertures or channels 33 (FIG. 4). According to some embodiments, the baffle 52 may extend to end walls 51 such that an upper plate of the baffle 52 engages the end walls 51 and retainer 72. This defines an upper boundary of the baffle. The interior of the baffle 52 defines a flow volume wherein cooling air flow is dispersed through a lower surface 53 so that air cools the shroud 50 positioned within the hanger 32. The baffle 52 extends circumferentially through the hanger cavity 46 and within an opening through the shroud 50 to provide impingement cooling to the inner surface of the shroud 50.

Referring now to FIG. 3, a side section view of a shroud hanger assembly 30 is depicted. An engine case 31, such as a high pressure turbine case, is depicted near the top of the figure and the hanger 30 is connected to the case 31 by way of tabs 38, 40. The tabs 38, 40 are depicted wherein a forward portion 34 of a hanger 32 is connected to the engine case 31 and a second portion 36 of the hanger 32 is also connected to the engine case 31. However, the tabs 38, 40 may both extend from one portion of the hanger 32 for example, as well. Both first and second hanger portions 34, 36 extend circumferentially to define a complete revolution by one or more segments. The tabs 38, 40 may be aligned in the axial direction or may offset radially. Additionally, the tabs may be at angles to the axial dimension or may extend axially as shown. According to the instant embodiment, the first hanger portion 34 includes the tab 38 for connecting to the engine case 31. The second hanger portion 36 includes the second tab 40 for connecting to the engine case 31. Both of these connections may be provided by sliding the portions 34, 36 in an axial direction into the engine case 31, for example by pressfitting therein. Other forms of connection to the engine case 31 however, may be utilized. The first hanger portion 34 includes the tab 38 and a leg 39 depending from the tab 38.

The first and second hanger portions 34, 36 defining hanger 32 may be formed of various materials such as low ductility, low coefficient of thermal expansion material, one non-limiting example may be ceramic matrix composite. According to other embodiments, the components of the shroud 50 may be formed of a low ductility, low coefficient of thermal expansion material. The material may have the same coefficient as the hanger 32 or may differ. Further, the materials of the hanger 32 and shroud 50 may differ. For example, the hanger 32 may be metallic, wherein the coefficient of thermal expansion is relatively higher than the material of the shroud 50 having a lower coefficient.

Extending from the leg 39 toward the second hanger portion 36 is the web 42. The web 42 extends in a generally linear fashion from a forward end to an aft end at a taper or angle and also extends circumferentially with the assembly 30. In alternative embodiments, the web 42 may be curvilinear or may be formed of various linear segments which may be turned at angles relative to one another in moving from the forward end at the leg 39 to the aft end near the second portion 36. At an aft end of the web 42 is a web tab 43. The web tab 43 is received by second hanger portion 36.

The tab 43 turns from the angled web 42 to an axial direction so that as the first hanger portion 34 moves in an axial direction to position the tab 38. The web tab 43 also engages the second hanger portion 36 within a web tab receiving groove 41.

The second hanger portion 36 receives the first hanger portion 34 in an axial direction and is captured by the first hanger portion 34 in the engine case 31. In this embodiment, the second hanger portion 36 functions as a spring leg to provide an axial force on a shroud 50 disposed within a cavity 46 of the hanger 32. The second hanger portion 36 includes a tab 40 which is positioned within a receiving groove of the engine case 31. Similarly, the second portion includes the web tab receiving groove 41 which receives the web tab 43 of the first hanger portion 34. The second hanger portion 36 extends in a circumferential direction defining a segment having a circumferential length. The second hanger portion 36 may further comprise various forms extending below the web tab receiving groove 41. In the instant embodiment, a lower portion of the second hanger portion 36 is generally U-shaped. The U-shaped lower end or lower portion 54 engages the shroud 50 providing a biasing force on the shroud 50.

In the exemplary embodiment, the first hanger portion 34 is generally the main body of the hanger 32 and the second hanger portion 36 is generally a spring body acting in combination with the first hanger portion 34. However, alternative embodiments may be provided wherein the second hanger portion 36 is of a larger size and mass so that the first hanger portion 34 is a smaller spring leg acting against the shroud 50 in an axial direction. Additionally, while a two-piece hanger 32 is provided, it is within the scope of present embodiments that hangers may be utilized with two or more pieces to define the hanger.

Engaging the lower portion 54 and extending toward the shroud 50 is a conformal seal 47. The seal 47 provides a spring force accommodating differential thermal growth, or growth at different rates, between the shroud 50 and the hanger 32. The seal 47 is seated within the lower portion 54 but various engagement features may be utilized. The seal 47 is curvilinear and extends between the inside curvature of the lower portion 54 and an aft surface of the shroud 50. The conformal seal 47 precludes air leakage from around the top of the shroud 50 and between the shroud 50 and the second hanger portion 36, which would move downwardly between the parts. The conformal seal 47 may be a "W" seal, however other shapes and designs may be utilized. The seal 47 may have angled peaks and valleys as opposed to the curved peaks and valleys depicted, for example. Additionally, the seal 47 provides a biasing force on the shroud 50 in the axial direction. The biasing force is not limited to the aft end of the shroud 50 but may be moved to the forward end as well. The seal 47 may be formed of various materials including, but not limited to, Waspaloy material.

Within the cavity 46 of the hanger 32 is the shroud 50. The shroud 50 is depicted as a closed top shroud but alternatively, may be an open top type shroud. The shroud 50 may be formed of a low ductility, low coefficient of thermal expansion material. One example may be a ceramic matrix composite. However, other composites and low ductility or low coefficient of thermal expansion materials may be utilized. According to one embodiment and as previously described, the material of the hanger 32 may be a differing coefficient of thermal expansion such that the shroud 50 and the hanger 32 have differing rates of expansion at given temperatures. Accordingly, the spring force provided by the lower portion 54 of the second hanger portion 36 and the spring 47 maintains a tight clamping force on the shroud 50.

Disposed within the shroud 50 is a baffle 52. The baffle 52 receives air flow through the hanger 32 and provides a control volume for dispersion of air along the inside surface 59 of the shroud 50. One or more of the shroud surfaces may be cooled by the baffle 52. However, it may be beneficial that the lower surface 53 at least be cooled. The baffle 52 may be utilized but alternatively is not a necessity according to instant embodiments.

Referring now to FIG. 4, a section view is provided at a different circumferential location of the assembly 30 than FIG. 3. According to the instant embodiment, a section is taken through a circumferential location of the assembly 30. In this view, the section cut is taken through a bolt 70 which may be utilized to connect the hanger 32 to the baffle 52.

The first hanger portion 34 includes one or more cooling apertures or paths 33 which extends from the forward end of the hanger assembly 32 into the hanger and is in flow communication with the baffle 52. The baffle 52 may be brazed to a seal or directly to a retainer 72. The bolt 70 extends through a projection 68 and allows connection between the hanger 32 and the retainer 72. The retainer 72 extends in a circumferential direction beneath an upper wall or surface 58 of the shroud 50. The retainer 72 provides a radial support for the shroud 50 inhibiting the shroud moving radially downward during operation of the engine. According to alternate embodiments, the projection 68 may be located at alternate positions than the central circumferential position.

Figure 5:
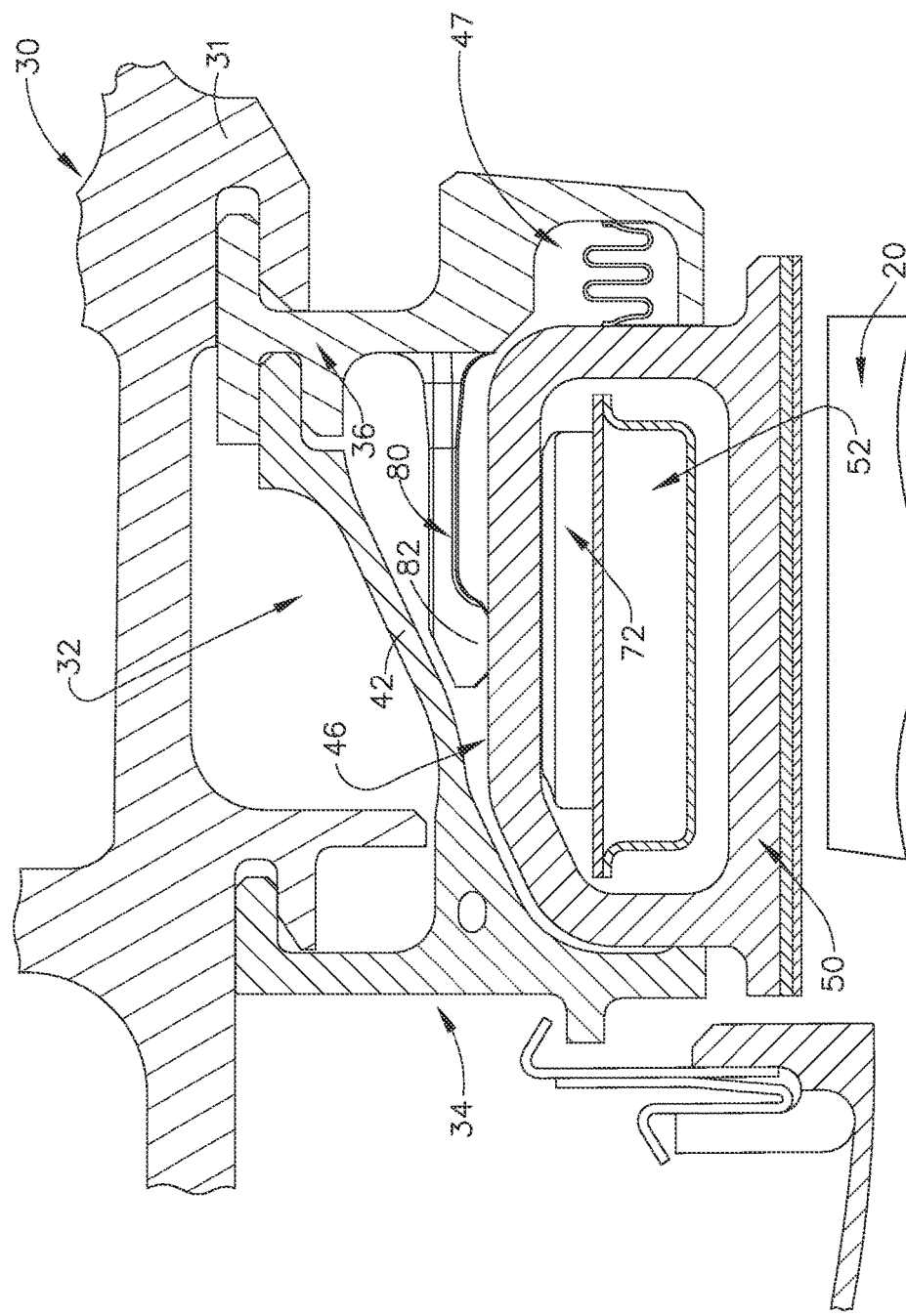
FIG. 5 is a further alternate side section view of an embodiment of the shroud hanger assembly.

Referring now to FIG. 5, a further section view is taken at a third circumferential location of the hanger assembly 30. In this view, extending from the second hanger portion 36 is an aft interference arm 80. The arm 80 extends from the second hanger portion 36 in a forward direction and has a projection 82. The arm 80 and projection 82 engage an upper surface of the shroud 50 to provide an interference force thereon. The projection 82 provides radial engagement with the shroud 50 to aid in retaining the shroud 50 in its position and preclude undesirable movement of the shroud 50 within the cavity 46 to some extent.

Figure 6:
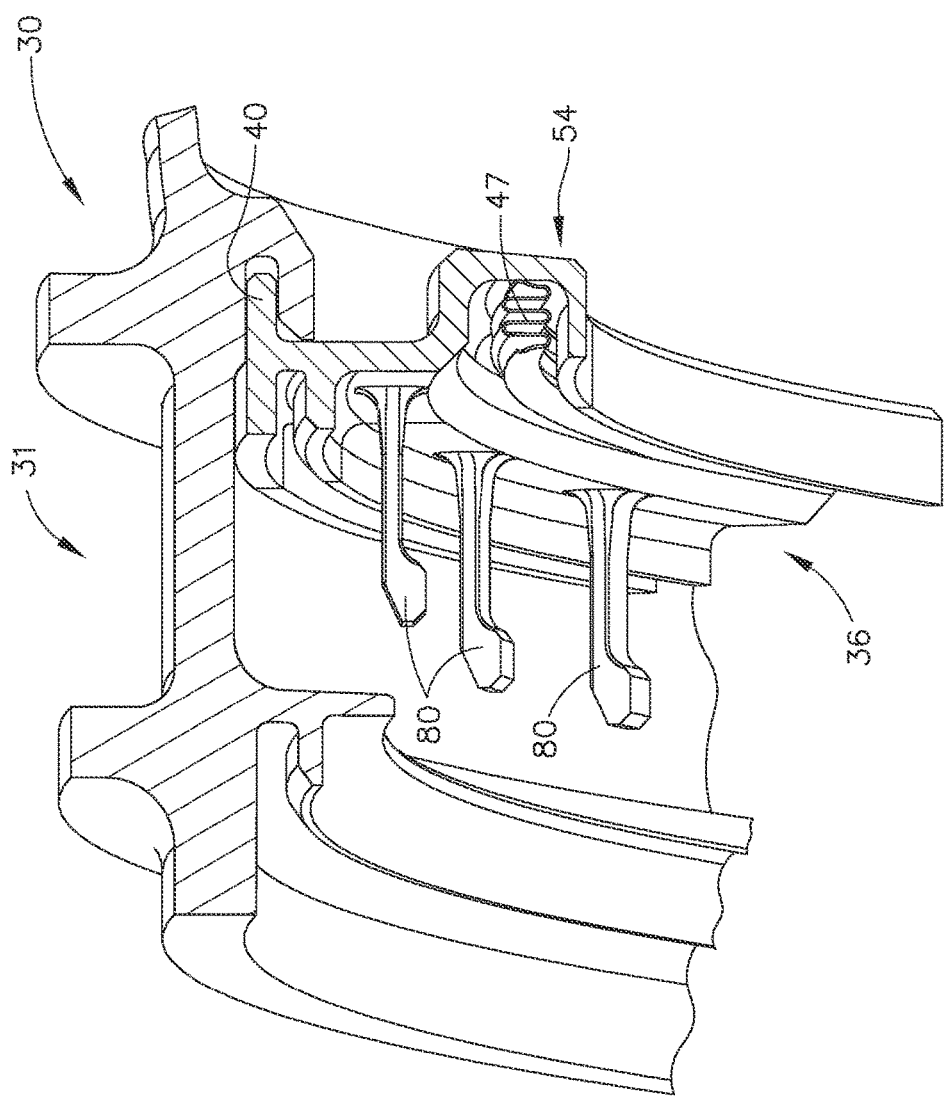
FIG. 6 is an isometric section sequencing assembly of the shroud hanger assembly.
Figure 7:
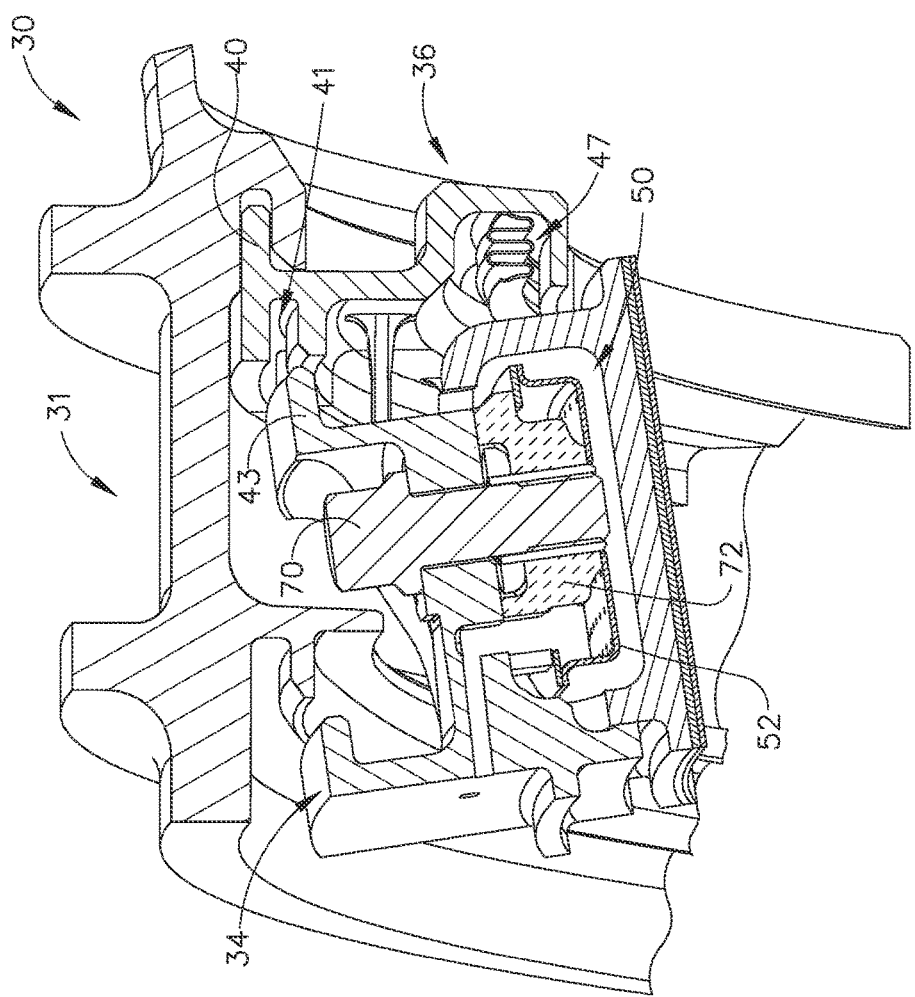
FIG. 7 is an isometric section sequencing further assembly of the shroud hanger assembly.
Figure 8:
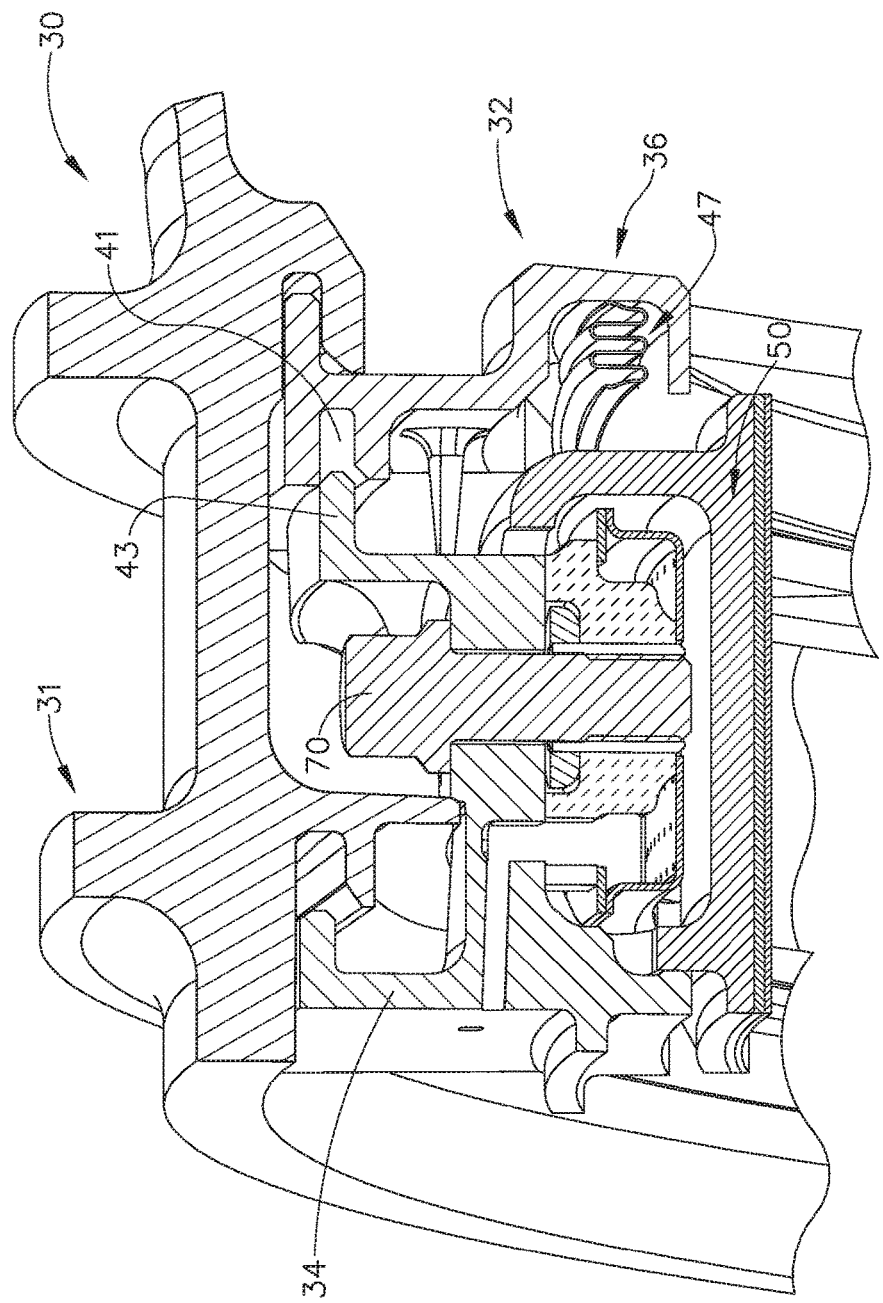
FIG. 8 is an isometric section sequencing further assembly of the shroud hanger assembly; and, FIG. 9 is a further alternative embodiment of a shroud hanger assembly.

Referring now to FIGS. 6-8, a plurality of isometric views are shown sequencing the assembly of the exemplary hanger assembly 30. Referring initially to FIG. 6, the side section view shows the second hanger portion 36 is shown positioned with tab 40 located in the casing 31. In the depicted view, the plurality of arms 80 are shown extending from the second hanger portion 36 toward the location where the first hanger portion 34 (not shown) is to be positioned.

Referring now to FIG. 7, the first hanger portion 34 is shown moving into position with the second hanger portion 36. The shroud 50 is connected to first hanger portion 34 by the bolt 70. The shroud 50 is bolted into position and retained by the retainer 72 with the baffle 52 connected to the retainer 72 and disposed within the opening of the shroud 50. The first hanger portion 34 is angled into position to web tab 43 into tab receiving groove 41.

Referring now to FIG. 8, the first hanger portion 34 is shown moved upwardly against the engine casing 31 at the forward end and moved into position adjacent a receiving groove 41 at the second hanger portion 36. From this position, the first hanger portion 34 and shroud 50 may be moved in an aft axial direction into engagement which compresses the conformal seal 47.

Figure 9:
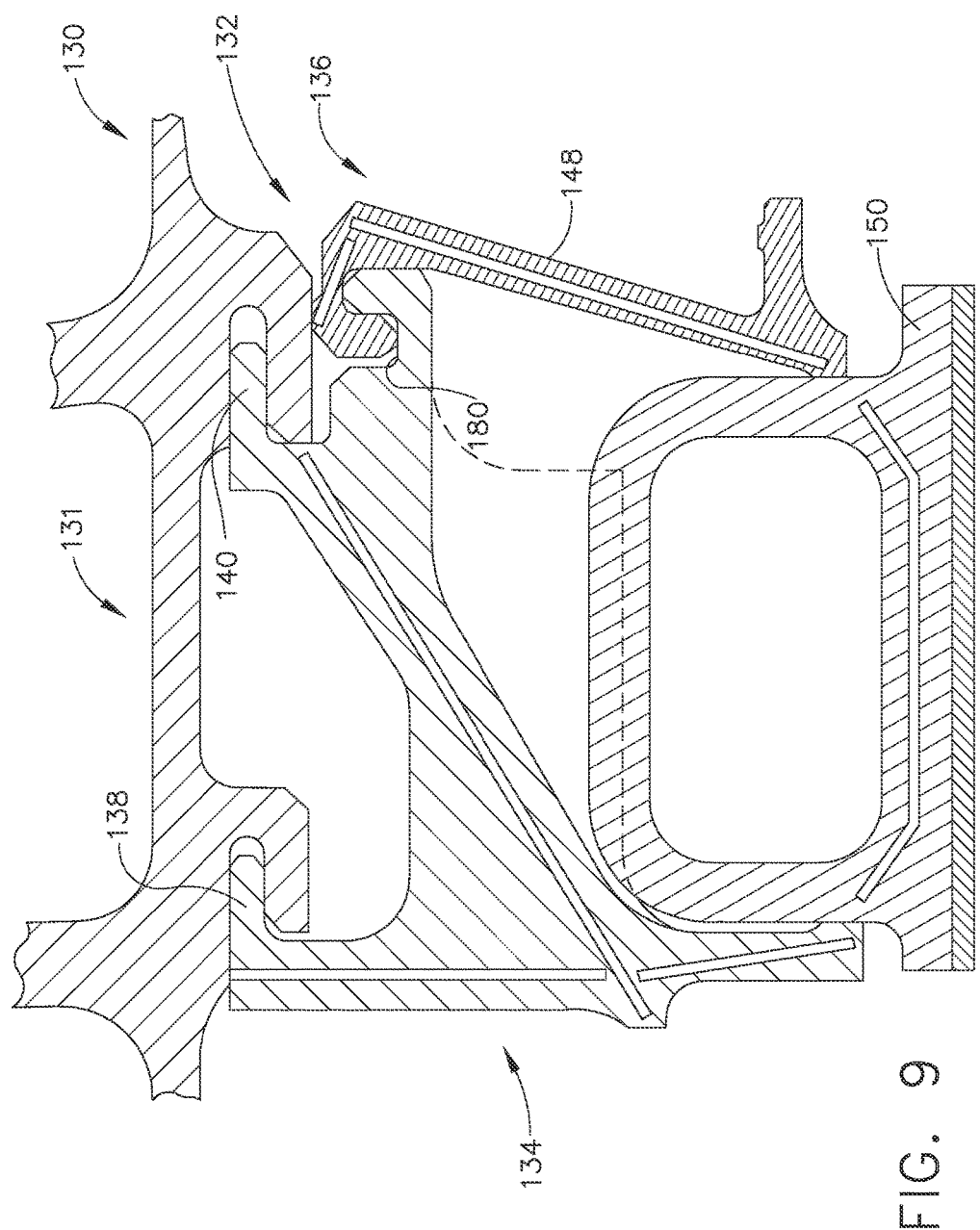

Referring now to FIG. 9, an alternate embodiment of hanger assembly 130 is depicted wherein a first hanger portion 134 is shown connected to an engine casing 131. The engine casing has first and second tabs 138, 140 and a radial groove 180 extends in a circumferential direction and receives the second hanger portion 136. In this embodiment, the second hanger portion 136 is captured between the engine casing 131 and the first hanger portion 134 as with the previous embodiment. However, the direction of clamping is in a radial direction as opposed to an axial direction of the previous embodiments. The second hanger portion 136 includes a leg 148 depending downwardly and which engages an aft end of the shroud embodiment 150. The slash faces of the hanger 132 and/or shroud 150 may include slots for spline seals.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A shroud hanger assembly for dimensionally incompatible components, comprising:
   an engine casing;
   a multi-piece hanger assembly formed of a first material, said multi-piece hanger assembly having a forward hanger portion and a rearward hanger portion, said multi-piece hanger assembly connected to said engine casing;
   a shroud formed of a low coefficient of thermal expansion second material different from said first material, said shroud disposed between said forward hanger portion and said rearward hanger portion;
   at least one cooling channel extending into said forward hanger portion of said multi-piece hanger assembly for impingement cooling of said shroud; and
   at least one sealing spring causing a biasing force acting on said rearward hanger portion to apply an axial interference force on said shroud, and
   wherein the at least one sealing spring causes the biasing force to act against one of an aft end and a forward end of said shroud.

2. The shroud hanger assembly of claim 1, wherein said at least one sealing spring is curvilinear.

3. The shroud hanger assembly of claim 1, wherein said at least one sealing spring is disposed between said shroud and said rearward hanger portion.

4. The shroud hanger assembly of claim 1, said forward hanger portion being larger in radial height than said rearward hanger portion.

5. The shroud hanger assembly of claim 4, said forward hanger portion having a first tab for engagement with said engine casing.

6. The shroud hanger assembly of claim 5, said rearward hanger portion having a second tab for engaging said engine casing.

7. The shroud hanger assembly of claim 6, wherein said forward hanger portion sandwiches said rearward hanger portion in said engine casing.

8. The shroud hanger assembly of claim 7, said rearward hanger portion having a receiving slot for receiving the first tab from said forward hanger portion.

9. The shroud hanger assembly of claim 8, wherein said rearward hanger portion is movable into said receiving slot in an axial direction.

10. The shroud hanger assembly of claim 8, wherein said rearward hanger portion is movable into said receiving slot in a radial direction.

11. The shroud hanger assembly of claim 8, said rearward hanger portion being cantilevered.

12. The shroud hanger assembly of claim 1, further comprising an arm extending axially from said rearward hanger portion and engaging an upper surface of said shroud.

13. The shroud hanger assembly of claim 1, said multi-piece hanger assembly being press fit.

14. The shroud hanger assembly of claim 1, said multi-piece hanger assembly being bolted together at least in part.

15. A shroud hanger assembly for dimensionally incompatible components, comprising:
   an engine casing;
   a multi-piece hanger assembly formed of a first material, said multi-piece hanger assembly having a forward hanger portion and a rearward hanger portion, said multi-piece hanger assembly connected to said engine casing;
   a shroud formed of a low coefficient of thermal expansion second material different from said first material, said shroud disposed between said forward hanger portion and said rearward hanger portion;
   at least one cooling channel extending into said forward hanger portion of said multi-piece hanger assembly for impingement cooling of said shroud; and
   wherein at least one of said forward hanger portion and said rearward hanger portion apply an axial interference force on said shroud; and
   wherein a biasing force acts against one of an aft end and a forward end of said shroud, and
   wherein one of said forward hanger portion and said rearward hanger portion sandwiches the other of said forward hanger portion and said rearward hanger portion against the engine casing.

16. The shroud hanger assembly of claim 15, the other of said forward hanger portion and said rearward hanger portion being captured in one of an axial direction and a radial direction.

* * * * *